(12) United States Patent
Vanderdrift (10) Patent No.: US 10,956,740 B1
(45) Date of Patent: Mar. 23, 2021

(54) ANIMATED AUGMENTED AND VIRTUAL REALITY AND OTHER FUNCTIONS IN RESPONSE TO TRIGGERS

(71) Applicant: Katharine Vanderdrift, San Francisco, CA (US)

(72) Inventor: Katharine Vanderdrift, San Francisco, CA (US)

(73) Assignee: Katherine Vanderdrift

( * ) Notice: Subject to any disclaimer, the term of this patent is extended or adjusted under 35 U.S.C. 154(b) by 0 days.

(21) Appl. No.: 16/213,899

(22) Filed: Dec. 7, 2018

(51) Int. Cl.
  *G06K 9/00* (2006.01)
  *G06T 19/00* (2011.01)
  *G06F 3/01* (2006.01)
  *G06T 7/73* (2017.01)

(52) U.S. Cl.
  CPC .......... *G06K 9/00671* (2013.01); *G06F 3/011* (2013.01); *G06T 7/73* (2017.01); *G06T 19/006* (2013.01); *G06T 2207/30204* (2013.01)

(58) Field of Classification Search
  None
  See application file for complete search history.

(56) References Cited

U.S. PATENT DOCUMENTS

| 2016/0048732 A1* | 2/2016 | Matoba | G06T 7/73 |
| | | | 345/633 |
| 2016/0162592 A1* | 6/2016 | Li | G06F 16/955 |
| | | | 235/375 |

OTHER PUBLICATIONS

Lei Hou; Xiangyu Wang; Leonhard Bernold, M.ASCE; and Peter E. D. Love, "Using Animated Augmented Reality to Cognitively Guide Assembly",ASCE, 2013 (Year: 2013).*

* cited by examiner

*Primary Examiner* — YuJang Tswei

(57) ABSTRACT

Techniques capable of using one or more sensors to detect one or more markers and to invoke one or more functions in response thereto. Markers can include one element, such as a particular item of artwork or jewelry, or a described class of items, such as a menu or song. Sensors can include a single detector, such as a camera, a group of detectors operating in cooperation; sensors can include active elements, such as a wireless receiver and transmitter. Functions can be invoked in response to sensor inputs, or a combination thereof. Functions can respond to user inputs, including moving the mobile device or entering data. Sensors can include a smartphone camera; markers can include jewelry; functions can include an animated augmented/virtual reality display in connection with a game playable using the smartphone and augmented/virtual reality display. Methods of doing business include downloading software and selling markers separately.

11 Claims, 2 Drawing Sheets

ANIMATED AUGMENTED AND VIRTUAL REALITY AND OTHER FUNCTIONS IN RESPONSE TO TRIGGERS

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Field of the Disclosure

This Application generally describes techniques relating to animated augmented and virtual reality and other functions in response to triggers, and other issues.

Related Art

Consumers often desire to wear or use jewelry and other accessories that are unique, or at least attractive and unusual. Even consumers who are not particularly interested in jewelry often have mobile devices (such as smartphones) and enjoy using those mobile devices to play games, read news, learn new topics, and obtain information.

One problem that has arisen is that the market for jewelry, other accessories, and other artwork, is relatively saturated. Moreover, jewelry (and other artwork) is relatively expensive, so it might be difficult for individuals to purchase more than a few pieces of reasonable quality. However, desire in the market for individual jewelry and other artwork is strong. Individuals often desire jewelry that is particular to their unique preferences.

Each of these issues, as well as other possible considerations, might cause difficulty in aspects of addressing the problems relating to providing substantially unique items of jewelry, other accessories, and other artwork, that consumers can have readily available for viewing or display.

SUMMARY OF THE DISCLOSURE

This summary of the disclosure is provided as a convenience to the reader, and does not limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

This Application describes devices, and techniques for using them, capable of using one or more sensors (such as a camera or microphone, whether part of the mobile device or coupleable thereto) to detect one or more markers (such as a picture, item of jewelry, or a song) and to invoke one or more functions (such as providing an animated augmented or virtual reality display on a mobile device, with or without an associated game, or such as controlling an external device) in response thereto. The marker can be a particular one element, such as a particular item of artwork or jewelry, or a particular person, or a described class of item, such as a menu, a song, a taxi, a wifi hotspot, or otherwise. The sensors can include a single detector, such as a camera, or a group of detectors operating in cooperation, such as multiple microphones, or a combination of a camera and a wireless receiver. The sensors can also include active elements, such as a combination of a wireless receiver and transmitter.

The functions can be invoked in response to a combination of sensor inputs, such as a Boolean combination, a weighted sum of inputs, or otherwise. In one embodiment, the functions can be responsive to user inputs (such as dynamically moving the mobile device, or entering data using the mobile device). The functions can operate continuously or in a loop until a terminating condition. In one embodiment, the sensors include a smartphone camera, the markers include an item of jewelry or other artwork, and the functions include providing an animated augmented or virtual reality display using the smartphone, in connection with a game playable using the smartphone and the augmented or virtual reality display.

This Application also describes methods of doing business using the markers, sensors, one or more presenting devices, and possibly other devices. The methods can include providing relatively low-cost software for mobile devices, such as downloadable mobile apps capable of operating on one or more types of mobile device, which can be used in combination with markers, sensors, or other elements, that are sold separately. The markers can include one or more of: (1) physical elements, such as framed pictures, jewelry, or other artwork; (2) non-physical elements, such as additional functions, selected data to be used with those functions, such as additional animations usable by the functions, or other capabilities to be used with the system. The sensors can include (4) physical elements, such as high-resolution cameras or microphones, scientific equipment, or other sensors not generally included with smartphones and similar devices; (5) non-physical elements, such as software disposed to be executed by mobile devices, directly or at their direction, or data to be used thereby, capable of providing other and further animations, capable of controlling other external devices, or otherwise not generally included with smartphones and similar devices or other detection techniques to be used with the system. Other items, such as devices capable of being controlled by the described techniques, software for operating such devices, or services for use with the described techniques, can also be provided.

BRIEF DESCRIPTION OF THE FIGURES

In the figures, like references generally indicate similar elements, although this is not strictly required.

After reading this Application, those skilled in the art would recognize that the figures are not necessarily drawn to scale for construction, nor do they necessarily specify any particular location or order of construction.

DETAILED DESCRIPTION

General Discussion

As further described herein, this Application describes devices and techniques which can generate AR (augmented reality) or VR (virtual reality) experiences using markers, sensors that can recognize the markers, processors that can run the AR or VR functions, and presentation devices. The processors can execute the functions associated with the sensor-recognized-makers that can generate the AR or VR experiences for rendering on presentation devices. The functions can change the AR or VR experiences as the markers change, as users interact with the markers, and as the spatial relationships between the makers and the sensors change. In one embodiment, markers can be included within jewelry, and the sensors and presentation devices can be included within a smartphone or other mobile device, with the effect that the jewelry can include AR or VR experiences that the wearer can share with others.

Markers and Sensor

As further described herein, devices, and techniques for using them, are capable of using one or more sensors (such as a camera or microphone, whether part of the mobile device or coupleable thereto) to detect one or more markers (such as a picture, item of jewelry, or a song). Markers can be quite general, such as one or more of:

A marker can include a particular individual item, such as a particular item of jewelry, a particular picture or other artwork, or a match to a particular photograph, drawing, or other scene. In such cases, the particular individual item can be specified by data or metadata used by a processor in a mobile device, such as a smartphone, MP3 player, or otherwise, or can be specified by a user directing the processor in the mobile device to recognize a particular item. The particular item can be any one of a large number of items described in a database accessible to the mobile device.

A marker can include an instance of a described class of objects, such as "a person" (such as can be detected by a camera, identifying an image of the person, or by a microphone, identifying a voice of the person), "a song" (such as can be detected by a microphone, identifying a sequence of notes or lyrics), "a taxicab" (such as can be detected by a camera, identifying an image of the vehicle, and identifying an image of a logo, medallion, or otherwise), "a wifi hotspot" (such as can be detected by a electromagnetic receiver/transmitter using a wifi protocol or a variant thereof), or any one of a large number of classes described in a database accessible to the mobile device.

As further described herein, sensors can be quite general, and their inputs be combined by a processor on a mobile device to determine the presence or absence of one or more markers. Moreover, sensors can be coupled to the mobile device, either directly, such as being integrated into the mobile device (as can be the case with a camera, a microphone, an electromagnetic receiver/transmitter), or indirectly, such as being accessible to the mobile device (as can be the case with one or more sensors coupled to the mobile device using a communication system, such as a using a cloud-accessible server, a virtual machine, a remote processor, a remote database, or otherwise).

For some examples, and without limitation, markers/sensors can include one or more of the following.

A marker can include a picture or image of a particular object, such as a particular picture included in an item of jewelry, such as a bracelet, pin, ring, or otherwise; and a sensor associated therewith can include a camera providing an image of the marker. In such cases, the processor can determine whether the picture or image is in fact the described marker, and can direct the mobile device to perform one or more functions associated with that marker, as further described herein. For example, the functions associated with that marker can provide an animated augmented or virtual reality presentation, such as one that the user can examine or manipulate, or possibly play a game with respect to the augmented or virtual reality presentation.

As further described herein, the described image can include either a specific image (such as one associated with a particular item of jewelry or artwork. Alternatively, the described image can include a class of images, such as an image of a person (or a particular class of persons, such as friends of the user), an image of a street sign (for which the associated function might include presenting an augmented or virtual reality translation), an image of a menu (for which the associated function might include presenting an augmented or virtual reality translation, or an augmented or virtual reality presentation of images of items associated with each menu item), an image of a weapon (such as could be identified for law enforcement or military users), or otherwise.

A marker can include a sound or class of sounds, such as a particular person's voice (and possibly identified to the user by highlighting an image of the person or providing additional information associated with the person), a particular word in a language to be identified to the user (and possibly translated for the user), a particular song (and possibly identified to the user by presenting information about the song, such as the name, singer, lyrics, genre, and availability for purchase).

A marker can include an electromagnetic feature of a local area, such as the presence or absence of a wifi hotspot (and possibly identified to the user by presenting the name of the hotspot and the business or other entity providing the hotspot), the presence or absence of a smartphone or other mobile device associated with a friend of the user, such as a person in the user's own smartphone contacts list (and possibly providing to the user information with respect to the name, distance, and location of that friend, or possibly sending or receiving one or more messages between the user and that friend with respect to their proximity).

A marker can include a status of a local area, such as a location, velocity, acceleration, or jitter being experienced by the user (or their mobile device), or a similar status with respect to an object identified by the user. Similarly, a marker can include another status of a local area (or a remote area identified by the user, such as another city or a location of a friend or other contact), such as a time (such as a time of day, a day of the week, month of the year, and similarly) in response to a local clock maintained by the mobile device, or in response to a time signal provided by a cell phone service. Similarly, a marker can include another status of a local area or another area, such as a weather report, an emergency alert, a status with respect to public events (such as an earthquake, fire, or law enforcement alert).

A marker can include a status of the user, such as a status of a game or other interactive activity with the mobile device (and possibly identified to the user by presenting an timer or an alert if the time exceeds a selected threshold), or an image of the user (and possibly identified to the user by triggering a selfie or other camera image). When the user is wearing a device disposed to measure physiological characteristics, such as a FitBit™ or similar device, the marker can include whether those physiological characteristics fall within a selected class, such as can be identified to the user by presenting an alarm (when those physiological characteristics indicate a medical alert), or by presenting another alert (such as indicating to the user that they are achieving an adequate cardio exercise level).

As further described herein, a marker can include a combination of multiple conditions determined by the sensors, such as one or more of: (A) an AND/OR combination of conditions, in which the processor identifies more than one condition and combines those conditions using a Boolean function; (B) a weighted sum of conditions, in which the processor identifies one or more conditions and combines those conditions using a weighted sum, such as to determine whether a threshold is reached, such as "a sufficient number of my friends are nearby"; (C) a fuzzy logic combination, in which the processor identifies one or more conditions and combines those conditions using a fuzzy logic technique, such as "a taxi is near enough to me to hail it" or such as "there aren't enough vegetarian options on this menu". As further described herein, other and further logical or statistical combinations of conditions can be determined by the processor in response to one or more sensors to determine the presence or absence of an identified marker.

Possible Functions

As further described herein, when the processor, in response to one or more sensors, determines the presence or absence of a marker, a function can be invoked. The function can include one or more of: a script, a mobile device app, a program to be executed using a remote device, or otherwise. For example, the function can include an animated augmented or virtual reality presentation using a screen accessible to the mobile device, such as a smartphone screen, a local presentation screen (such as an Apple TV™ or other coupled screen), or otherwise.

In one embodiment, the function can use the one or more processors available at the mobile device, such as a smartphone processor or graphics processor. The function can present an animated augmented or virtual reality presentation, such as an animated version of a picture included in the marker. For example, the marker can include a picture disposed on an item of jewelry; when the mobile device is disposed to detect the picture, the mobile device can present an animated augmented or virtual reality presentation in which the picture (or parts thereof) show motion. For another example, the function can include loops and other control structure so as to show an animated augmented or virtual reality presentation that can repeat, or can present other motion in response to conditions identified by the mobile device.

In one embodiment, the function can operate in response to user action, such as when the user moves the mobile device, changes its angle with respect to the user, or tilts or pans or otherwise alters a POV (point of view) with respect to the user. In such cases, the function can adjust or alter the animated augmented or virtual reality presentation in response to the user action. For example, the function can show new or altered elements of the animated augmented or virtual reality presentation in response to user action, such as bringing one or more objects into view or out of view, altering the relative occlusion of one or more objects in the view, altering the size (or color or shape) of one or more objects, or otherwise.

In one embodiment, other user action can include touching or pressing on a screen (or other sensor) of the mobile device, such as the user touching a location associated with an object to be presented in the animated augmented or virtual reality presentation. For example, the augmented or virtual reality presentation can include a game in which the user attempts to touch (or otherwise use hand-eye coordination) "good" objects that obtain points, while avoiding touching "bad" objects that subtract points. In such cases, the user can attempt to obtain a good score, which can be maintained at a remote device, such as a remote database showing a leaderboard of high scores.

In one embodiment, other user action can include voice input, such as directing the mobile device, or an AI (artificial intelligence) avatar such as Apple's "Sin"™, to adjust or alter the animated augmented or virtual reality presentation. For another example, when the marker includes an image of a menu, the user can use a voice command to request further information about a particular menu item: the user can request translation into a particular language, the user can request whether the menu item includes allergens, the user can request further detail about a presentation of the menu item, and otherwise. For another example, when the marker includes an image of a taxicab, the user can use a voice command to request price information, to hail the taxicab, and to request travel to a designated location, all whether or not the taxicab is self-driving or otherwise.

In one embodiment, the function can operate with or using another device, not necessarily coupled to the mobile device. For example, the function can operate in response to determining the presence or absence of a marker to direct a home control system to turn on/off a security system, to turn on/off a set of lights, to adjust a setting of a thermostat, to add or adjust or remove information at a remote database, to couple to a web server (such as to obtain information or to purchase products), or otherwise. Similarly, the function can operate using the mobile device to add or adjust or remove information in a local storage, local database, or otherwise.

Methods of Doing Business

In one embodiment, methods of doing business can include providing software for mobile devices, such as downloadable mobile apps capable of operating on one or more types of mobile device, possibly at relatively low-cost or no cost. In such cases, the software can operate with markers that include physical elements, such as framed pictures, jewelry, or other artwork, which can be sold separately from the software and can command a relatively premium price. For example, the software can operate with a marker such as a bracelet, pin, or ring that includes a 2D picture which can be recognized by the software; in response thereto, the software can provide an animated augmented or virtual reality presentation. In one embodiment, the augmented or virtual reality presentation can provide an animated 3D variation of the 2D picture shown on the bracelet, pin, or ring. This can provide additional aesthetic value to the bracelet, pin, or ring; this can have the effect that the bracelet, pin, or ring, can be sold at a relatively premium price.

In one embodiment, methods of doing business can include providing software for mobile devices, such as downloadable mobile apps capable of operating on one or more types of mobile device, possibly at relatively low-cost or no cost, that operate with markers that include physical elements, such as framed pictures, jewelry, or other artwork, as further described herein. The markers can also include data or metadata that can be purchased separately, such as by an "in-app purchase", in which a user can purchase additional features or functions while operating the software. For example, the user can use an in-app purchase, or a separate purchase, to obtain additional features such as (A) additional augmented or virtual reality presentations, (B) additional objects shown in the augmented or virtual reality presentations, (C) additional activity by the augmented or virtual reality presentations in response to user movement or commands, (D) multiple-player interactive features of the augmented or virtual reality presentations, (E) real world rewards for success at one or more activities provided by the augmented or virtual reality presentations, such as a game or contest, or otherwise.

In one embodiment, methods of doing business can include providing software for mobile devices, such as downloadable mobile apps capable of operating on one or more types of mobile device, possibly at relatively low-cost or no cost, that operate with markers that include physical or non-physical elements, such as a catalog, menu, or other presentation of products for sale. For example, the software can operate with the physical elements or non-physical elements to allow one or more users to view an augmented or virtual reality presentation of the items described in the catalog or menu, and to view additional information with respect to those items. For example, when the items are described in a menu, the user can view additional information as further described herein, and can decide to order those items at a restaurant or using a take-out service in response thereto. For another example, when the items are described in a catalog, the user can view additional information or otherwise inspect the objects using the augmented or virtual reality presentation, and can bid for, or otherwise purchase, those objects. In such cases, the catalog can include a physical catalog such as could be distributed at an art gallery, or can include a non-physical catalog such as could be distributed using a web site or other communication service.

In one embodiment, methods of doing business can include providing software for mobile devices, such as downloadable mobile apps capable of operating on one or more types of mobile device, possibly at relatively low-cost or no cost, that operate with markers that include physical elements, such as wearable objects on sale at a store or at a web site. For example, the function can obtain images of the user and can provide an animated augmented or virtual reality presentation that includes how the user would look while wearing one or more objects. In such cases, the objects can include hats, glasses or sunglasses, scarves, jewelry, clothing, shoes, handbags or purses, technology accessories or other accessories, or otherwise.

Differences

The techniques described herein provide an animated augmented or virtual reality experience, more than just information associated with an object (to which a barcode might be attached), more than just options for the user to execute in response to recognized objects (which might be recognized by products such as Google Glass™), more than adjusting control of a vehicle (such as an airplane in response to guided system landing sensors), and more than presenting only a fixed virtual reality experience (such as in response to a hologram or a virtual reality presentation in response to a marker). As further described herein, the devices and techniques described herein provide animated augmented or virtual reality experiences that can be manipulated by the user in response to, e.g., spatial relations and orientation between markers and the presentation device.

Terms and Phrases

The term "marker", and variants thereof, generally refers to any detectable condition, such as the presence or absence of a particular object, the presence or absence of an instance of a described class of objects, a combination of other markers, or otherwise as described herein. For example, a combination of other markers can include a Boolean combination of identifiable conditions, a weighted combination of identifiable conditions, a fuzzy logic or other nearness condition, an output of an artificial neural network whose inputs are responsive to identifiable conditions, another defined function of information detectable by a sensor (as further described herein), or otherwise.

The term "sensor", and variants thereof, generally refers to any device disposed to detect information, whether real world information, such as from an input device (as further described herein), stored information, such as locally or remotely maintained, and whether maintained in memory, mass storage, or an accessible database. For example, a sensor can include a still or motion-picture camera, a microphone, a capacitive or pressure-sensitive surface, a fingerprint sensor, an electromagnetic receiver or transmitter, or otherwise. In such cases, multiple sensors, whether similar or distinct, can operate collectively, such as a combination of a camera and a microphone used to identify a person. In one embodiment, a sensor can include at least a portion of a mobile device, such as a camera or a microphone included in a smartphone or other audio/video device, or otherwise.

The phrase "mobile device", and variants thereof, generally refers to any relatively portable device disposed to detect one or more markers, to perform one or more functions, and to provide one or more outputs. For example, a mobile device can include a smartphone, an MP3 player, a laptop or notebook computer, a computing tablet or phablet, a set of AR or VR (augmented or virtual reality) goggles, or any other relatively portable device disposed to be capable as further described herein.

The phrase "remote device", and variants thereof, generally refers to any device disposed to be accessed, such as by a mobile device, and not already integrated into the accessing device. For example, a remote device can include a database or a server, or another device or otherwise, coupled to a communication network, accessible using a communication protocol. For another example, a remote device can include one or more mobile devices other than a user's mobile device, accessible using a telephone protocol, a messaging protocol such as SMS or MMS or a variant thereof, an electromagnetic signal such as NFC or RFID or a variant thereof, or otherwise.

The term "random", and variants thereof, generally refers to any process or technique having a substantially non-predictable result, and includes pseudo-random processes and functions.

FIGURES AND TEXT

Example Systems

Figure 1:
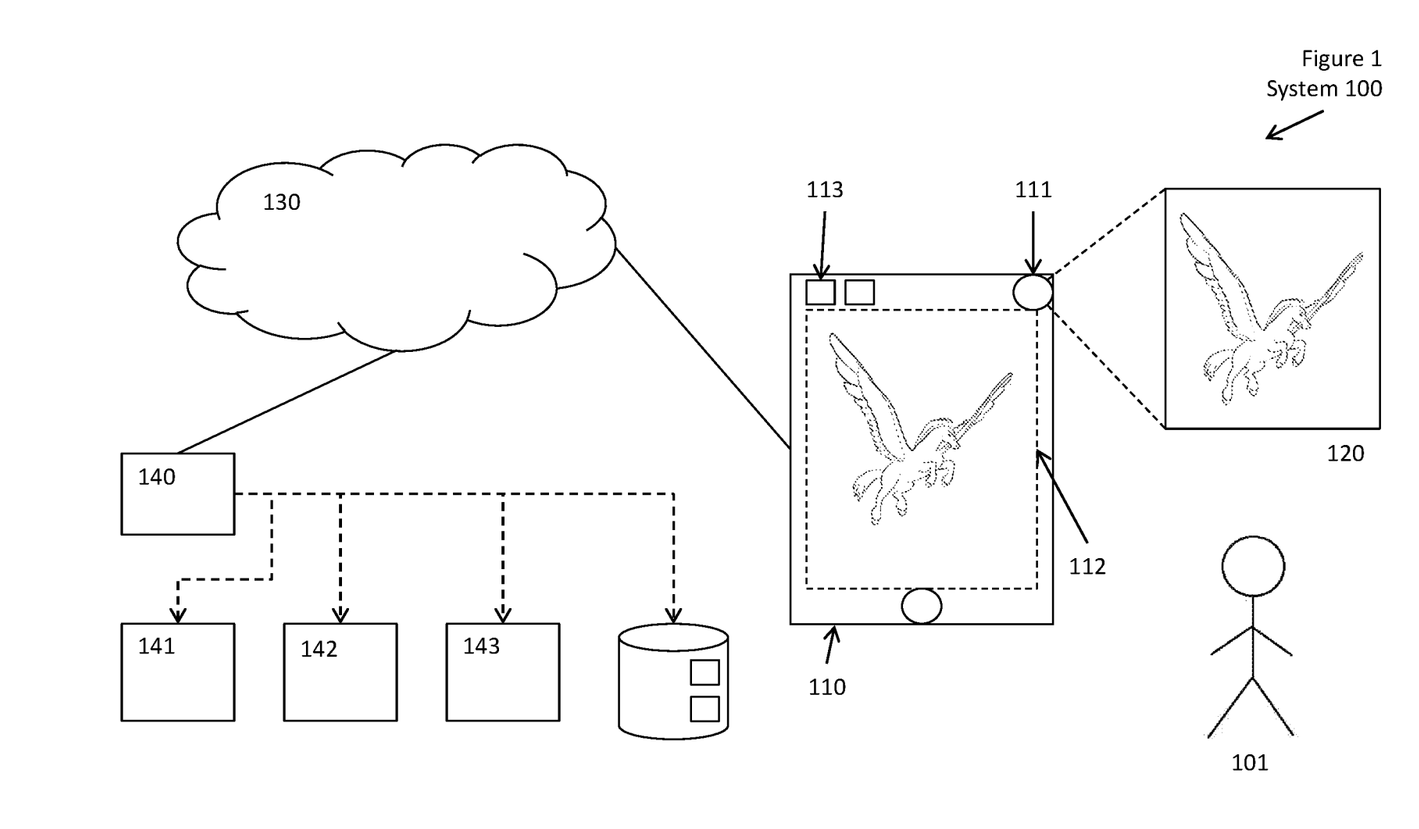
FIG. 1 shows a conceptual drawing of an example system disposed to provide functions, such as animated augmented or virtual reality, in response to triggers, such as one or more identifiable markers.

FIG. 1 shows a conceptual drawing of an example system disposed to provide functions, such as animated augmented or virtual reality, in response to triggers, such as one or more identifiable markers.

As further described herein, a system 100 is described with respect to elements as shown in the figure, and as otherwise described herein, such as:

a mobile device 110, such as further described herein, possibly including one or more input devices 111, output devices 112, and computing devices 113;

a marker 120, such as further described herein, possibly including one or more physical elements, non-physical elements, or satisfiable conditions;

an (optional) communication network 130, such as further described herein, possibly including one or more communication protocols;

an (optional) remote device 140, such as further described herein, possibly including one or more cloud-services devices 141, virtual machines 142, remote applications 143, databases 144, remote mobile devices 145, or otherwise.

In one embodiment, the system 100 is associated with one or more users 101, such as a person associated with or using the mobile device 110, or such as another person associated with or using a remote mobile device 145, or otherwise. In general, users 101 are natural persons, such as persons using a smartphone or other mobile device 110. However, the users 101 are not part of the system 100. Moreover, while this Application primarily describes use of the system 100 by natural persons, in the context of the invention, there is no particular requirement for any such limitation. For example the system 100 can operate without user control.

In one embodiment, the mobile device 110 can include one or more input devices 111, such as one or more of:

video input devices, such as one or more still cameras, motion-picture cameras, or otherwise;

audio input devices, such as one or more microphones or otherwise;

haptic input devices, such as one or more touch screens sensitive to touch at a location or to gestures, buttons or keys, strain gauges or other pressure sensors, or otherwise;

movement input devices, such as one or more accelerometers, movement sensors, GPS or other location sensors, or otherwise;

electromagnetic input devices, such as one or more elements for operation of telephone communication, wifi communication, NFC (near field communication), RFID (radio frequency ID), SMS or MMS or other text messaging protocol, or variants thereof, or otherwise.

As further described herein, the one or more input devices 111 can operate, individually or collectively, and possibly in cooperation with one or more of the computing devices, as one or more sensors 114, capable of determine the presence or absence of one or more markers 120.

In one embodiment, the mobile device 110 can include one or more output devices 112, such as one or more of:

video output devices, such as one or more screens capable of presenting text, still pictures, motion pictures, holograms, AR (augmented reality) images, VR (virtual reality) images, or otherwise;

audio output devices, such as speakers or otherwise, capable of presenting sound effects (e.g., musical tones or otherwise), voice output (whether natural, recorded, synthesized, or otherwise), music or songs, or otherwise;

haptic output devices, such as buzzers, vibration elements, or otherwise;

electromagnetic output devices, such as one or more elements for operation of communication techniques described herein, or variants thereof, or otherwise.

In one embodiment, the mobile device 110 can include one or more output devices 112, such as one or more of:

video output devices, such as one or more screens capable of presenting text, still pictures, motion pictures, holograms, AR (augmented reality) images, VR (virtual reality) images, or otherwise;

In one embodiment, the mobile device 110 can include one or more computing devices 113, including one or more processors, program and data memory, buffer storage, and software capable of controlling the input devices 111 and output devices 112. For example, the computing devices 113 can be disposed to receive data and metadata from the input devices 111, perform one or more operations on that data and metadata (possibly communicating with one or more remote devices 140 to obtain additional data or metadata or to process that data or metadata), so as to determine the presence or absence of one or more markers 120.

In one embodiment, the computing devices 113 can also be disposed to perform one or more functions in response to determining the presence or absence of one or more markers 120. For example, the functions can be disposed to provide an animated AR or VR presentation at an output screen of the mobile device 110 in response to determining the presence of a particular marker 120. In such cases, the particular marker 120 can be associated with a particular animated AR or VR presentation, and the functions can be disposed to adjust or alter the animated AR or VR presentation in response to the input devices 111, such as when the user 101 tilts, pans, or otherwise moves the mobile device 110 when viewing the presentation.

In one embodiment, the one or more functions can be responsive to a context, such as a time of day or day of the week, a location of the user 101 or mobile device 110, a local or remote weather condition, or otherwise. The functions can include their associated context with their software, such as by downloading their context and software from one or more remote databases 144.

As further described herein, the markers 120 can include one or more of:

a physical object, such as a particular item of artwork or jewelry, a particular person (or a particular person's face or fingerprint), or otherwise as further described herein;

a non-physical object, such as data element or metadata element, or otherwise as further described herein;

a described class of objects, such as "a person", "a menu", "a taxicab", "a weapon", or otherwise.

For example, as further described herein, the marker 120 can include one or more of:

a particular picture mountable on a bracelet, pin, ring, other wearable element of artwork or jewelry, or otherwise. Similarly, the marker 120 can include a particular picture, such as an item of artwork, mountable in a picture frame, on a wall, on a page of a book or booklet, or otherwise.

a particular class of pictures, such as a menu. In such cases, one or more functions can include a translation of the menu into a selected language, one or more animated augmented or virtual reality presentations of items indicated by the menu, information with respect to items indicated by the menu (such as price, allergens, nutritional information such as calories or nutrients, qualification as vegetarian or with other dietary restrictions, or otherwise), availability of items at a time the menu image is captured, a measure of novelty to the particular user 101, or otherwise.

a particular person or class of person, such as determined in response to a visual image of their face, an audio image of their voice, an electromagnetic indication that their smartphone (or other mobile device 110) is nearby, or otherwise.

a sound or class of sounds, such as a particular person's voice (and possibly identified to the user by highlighting an image of the person or providing additional information associated with the person), a particular word in a language to be identified to the user (and possibly translated for the user), a particular song (and possibly identified to the user by presenting information about the song, such as the name, singer, lyrics, genre, and availability for purchase).

or as otherwise identified, as further described herein.

When the marker 120 includes a particular picture mountable on a bracelet, pin, ring, other wearable element of artwork or jewelry, or otherwise, the marker can be associated with one or more functions that provide the user 101 with an animated augmented or virtual reality presentation, such as a game or contest. For example, the animated augmented or virtual reality presentation can include the possibility that the user 101 can interact therewith. For example, the user 101 can adjust the mobile device 110 to obtain different views of the augmented or virtual reality presentation. For another example the user 101 can touch or press (or otherwise dispose) their fingers or hands on or near the mobile device 110, so as cause the functions to manipulate the augmented or virtual reality presentation.

For example, the user 101 can manipulate the augmented or virtual reality presentation in the form of a game: the user can use hand-eye coordination to manipulate the game, scoring points for touching "good" items and avoiding "bad" items, such as in known 2D (two-dimensional) video games. In one embodiment, the functions can maintain, such as at one or more remote databases 144, a set of scores for users 101, whether personalized to the particular user (and possibly their associated friends) or generalized to the game (and including all of a selected class of users). In such cases, the functions can present a leaderboard or a set of high scores, either for the particular user 101 or for a class of users (such as the user and their friends, or such as a class of users in a locale or region).

As further described herein, a marker can include a combination of multiple conditions determined by the sensors, such as one or more of: (A) an AND/OR combination of conditions, in which the processor identifies more than one condition and combines those conditions using a Boolean function; (B) a weighted sum of conditions, in which the processor identifies one or more conditions and combines those conditions using a weighted sum, such as to determine whether a threshold is reached, such as "a sufficient number of my friends are nearby"; (C) a fuzzy logic combination, in which the processor identifies one or more conditions and combines those conditions using a fuzzy logic technique, such as "a taxi is near enough to me to hail it" or such as "there aren't enough vegetarian options on this menu". As further described herein, other and further logical or statistical combinations of conditions can be determined by the processor in response to one or more sensors to determine the presence or absence of an identified marker.

In one embodiment, the system 100 can include a communication network 130, such as a computing network, such as the internet or a portion thereof, another computing network such as can be employed for relatively private use, a VLAN (virtual local area network) or a variant thereof, or otherwise.

In one embodiment, the system 100 can include a one or more remote devices 140, including one or more cloud-services devices 141, virtual machines 142, remote applications 143, databases 144, remote mobile devices 145, or otherwise. For example, the mobile device 110 can access the cloud-services devices 141 using the communication network 130 to create or modify one or more virtual machines 142.

For another example, the mobile device 110 can access one or more virtual machines 142 to invoke one or more remote applications 143 which can be disposed to perform one or more processes to assist those functions. In such cases, the one or more remote applications 143 can perform operations that might be beyond the capabilities of the processor or memory at the mobile device 110. For example, the remote applications 143 can perform extensive machine learning operations that include use of processing power or devices not generally available at the mobile device 110.

For another example, the mobile device 110 can access one or more remote databases 144 to maintain data or metadata to be used with respect to (A) determining the presence or absence of one or more particular markers 120, (B) determining the presence or absence of one or more instances of a particular class of markers 120, (C) performing one or more functions invoked in response to the presence or absence of one or more markers 120 or instances of a particular class of markers 120. In such cases, the one or more remote databases 144 can include information that might be otherwise unavailable to the mobile device 110; this information can include information that is more extensive than readily maintainable at the mobile device 110, such as extensive geographic data, otherwise voluminous information, or otherwise;

information that is updated by one or more devices not readily coupled to the mobile device 110, such as real-time computer network traffic information, real-time news, real-time securities trading information, real-time vehicle traffic information, real-time weather information, other real-time information, other information collected by devices not generally coupled to the mobile device 110, or otherwise.

Example Methods of Operation

Methods of operation can include steps as described herein. While the steps are shown and described in a linear order, in the context of the invention, there is no particular requirement for any such limitation. Except where explicitly stated, there is no particular requirement for the steps to be encountered or performed linearly, or in any particular order or by any particular device. For example and without limitation, the steps can be encountered or performed in parallel, in a pipelined manner.

Figure 2:
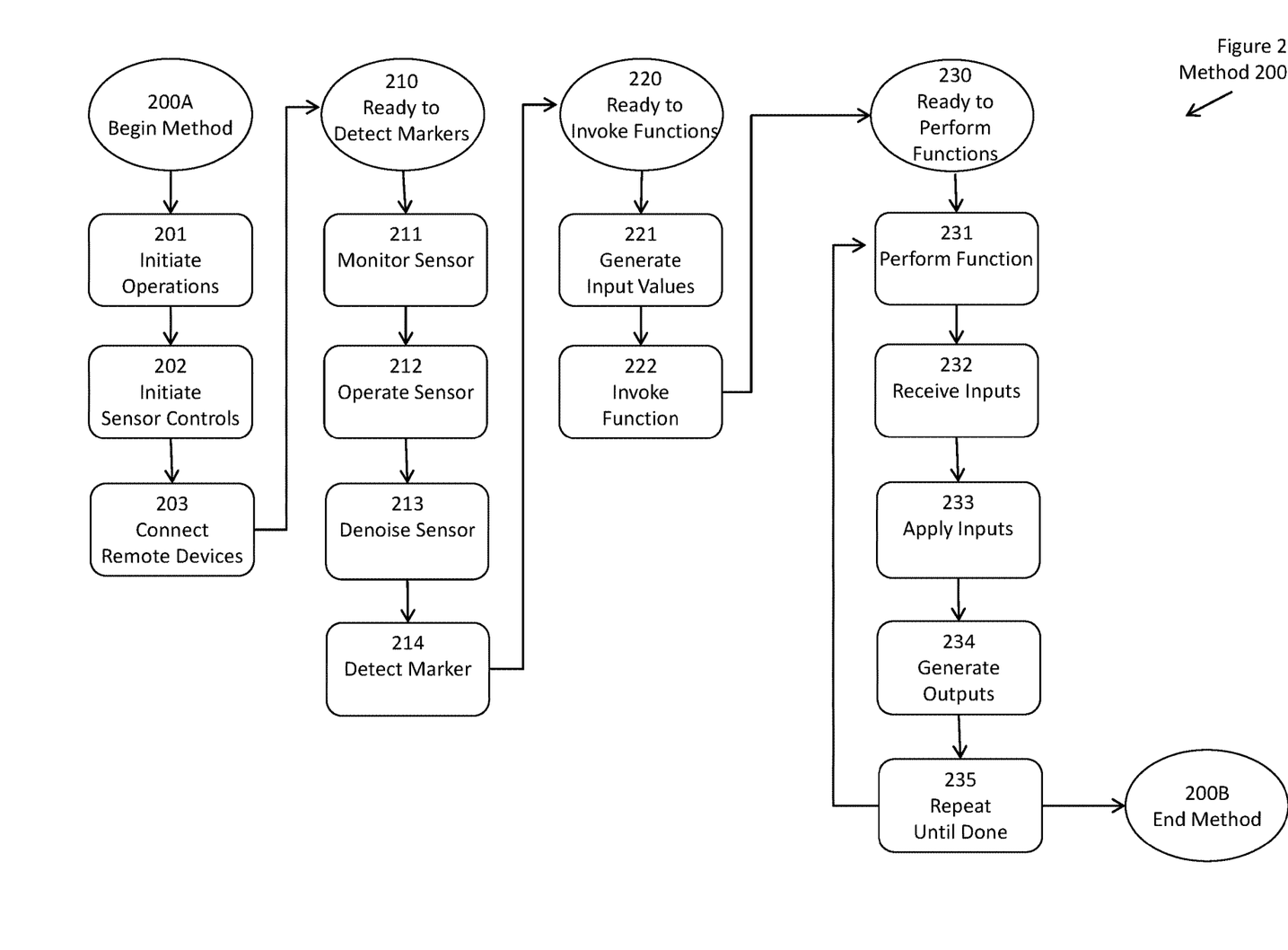
FIG. 2 shows a conceptual drawing of an example method of using a system that provides functions in response to triggers, such as operating a mobile device with those triggers.

FIG. 2 shows a conceptual drawing of an example method of using a system that provides functions in response to triggers, such as operating a mobile device with those triggers.

A method 200 includes flow points and method steps as shown in the figure, and as otherwise described herein, such as:

a flow point 200A, in which the method 200 is ready to begin;

a flow point 210, in which the method 200 is ready to detect markers;

a flow point 220, in which the method 200 is ready to invoke functions associated with markers;

a flow point 230, in which the method 200 is ready to perform functions associated with markers;

a flow point 200B, in which the method 200 is ready to finish.

Beginning of Method

A flow point 200A indicates that the method 200 is ready to begin.

The method 200 can be triggered by one of more of the following:

an alert or signal from the mobile device, such as when the mobile device is powered on, activated, or when another function of the mobile device is completed (such as a phone call);

a designated time, such as a selected time of day, a periodic time, a random time, or otherwise;

a passage of time, such as from a last time the method 200 was started, from the last time the method 200 was finished, from the last time a user input was received, or otherwise;

a user input (such as moving the mobile device or providing an input to the mobile device), such as requesting that the method 200 should be started;

a message from an external device, such as an SMS or MMS message, a wifi connection, a location device, or otherwise;

or as otherwise described herein.

For example, the method 200 can operate continuously until after a selected time when the user has not interacted with the method, after which the method can wake up periodically to determine whether it should start operation, such as every 100 milliseconds (msec).

For another example, the method 200 can operate continuously until the mobile device has moved a selected distance from where it was operated, after which the method can wake up periodically to determine whether it should start operation, such as each time the mobile device has moved 10 meters.

At a step 201, the mobile device 110 can initiate operations and starts/restarts any operations that are necessary or convenient. For example, the mobile device 110 can allocate and possibly initialize useful storage values. The method 200 can also perform any desirable initiating routines.

At a step 202, the mobile device 110 can allocate and possibly initialize controls for one or more sensors 114 it can access.

At a step 203, the mobile device 110 can contact and possibly initialize communicate with one or more remove devices 140 it can access.

The method can proceed with the next flow point.

Detecting Markers

A flow point 210 indicates that the method 200 is ready to detect one or more markers 120.

At a step 211, the mobile device 110 can activate the sensor 114, or where applicable, can monitor the sensor 114 for one or more inputs. When the sensor 114 is essentially always on, the mobile device 110 can couple an input, such as a storage buffer for input data from the sensor, to an input port coupled to the sensor.

As part of this step, the mobile device 110 can operate one or more controls or parameters for the sensor 114. For example, mobile device 110 can direct the sensor to (or can adjust inputs it receives from the sensor to) adjust one or more parameters with respect to inputs it perceives.

For example, when the sensor 114 includes a camera or other light sensor, the mobile device 110 can adjust the depth of field, focus, frame rate, frequency equalization, resolution, other controls applicable to a camera, or otherwise. For another example, when the sensor 114 includes a microphone or other audio sensor, the mobile device 110 can adjust the audio input gain, frequency equalization, other controls applicable to a microphone, or otherwise. For another example, when the sensor 114 includes a location device, accelerometer, or other movement-sensitive device, the mobile device 110 can adjust the data acquisition rate, sensitivity, resolution, other controls applicable to a movement-sensitive device, or otherwise. For other input devices 111, the mobile device 110 can adjust a measure of data bandwidth, a measure of processor usage, other features particular to the other input devices, or otherwise.

At a step 212, the mobile device 110 can operate the sensor 114, or where applicable, can monitor the sensor 114 for one or more sets of input data. Where applicable, the mobile device 110 can maintain the one or more sets of input data from the sensor 114 in a storage buffer.

At a step 213, the mobile device 110 can perform one or more actions to eliminate noise from, normalize, or otherwise modify input data from the sensor 114, so as to allow the mobile device to detect one or more markers 120. For example, when the sensor 114 includes a camera or other light sensor, the mobile device 110 can apply one or more filters to the input data to adjust for glare, jitter or other time adjustment, jostling or other movement adjustment, occlusion, tilt or other direction adjustment, or other artifacts or noise possibly associated with still pictures or motion pictures.

At a step 214, the mobile device 110 can detect one or more markers 120 using one or more actions with respect to input data from the sensor 114.

In one embodiment, the mobile device 110 can recognize the selected marker 120 using one or more AI (artificial intelligence) or ML (machine learning) techniques. For example, the mobile device 110 can include a trained artificial neural network, disposed to respond to input data from the sensor 114 with an evaluation of whether image data provided by a camera is, with relatively high probability, an image of the selected marker 120. In such cases, when the neural network indicates that the image data is associated with the selected marker 120, the method 200 can proceed with the next step. When the mobile device 110 does not successfully recognize the selected marker 120, the method 200 can return to the step 211 or the step 212 to receive input data from the sensor 114 and re-attempt to recognize one or more selected markers 120.

In one embodiment, the mobile device 110 can recognize the selected marker 120 using one or more combinations of sensors 114. For example, the combination of sensors 114 can include one or more of:

an AND/OR combination of sensors 114, such as (A OR B) AND C, where A, B, and C represent when a sensor meets a selected criterion, such as "the camera sees either picture A or picture B, while in my house";

a nearness value of a sensor 114 to a selected test value, such as (A NEAR B), where A represents a sensor value and B represents a selected test value, and "NEAR" represents a function such as whether A is within 10 meters of B, such as "my friends A and B are near each other";

a weighted sum (or product) of more than one sensor 114, such as (at least N A's are detected), where A represents a sensor value or a detected marker 120, and N represents a selected threshold, such as "at least three of my friends are in this room";

a result of applying a neural network to detecting one or more markers 120, either collectively at once or over a time duration, such as "there have been several giraffes near me recently";

or otherwise as further described herein.

As part of this step, the mobile device 110 can recognize the selected marker 120 in response to data it receives from other sensors 114, maintains in buffer storage, or maintains in a database (whether local or remote).

The method can proceed with the next flow point.

Invoking Functions

A flow point 220 indicates that the method 200 is ready to invoke functions associated with one or more detected markers 120.

At a step 221, the mobile device 110 can generate input values to be sent to the functions, and prepare those input values to be sent to the functions, such as being sent to the functions as calling parameters or otherwise. For example, when the marker 120 includes a specific physical object, the input values can include a location of the object, such as a direction and distance, or such as a set of absolute or relative 3D (three dimensional) coordinates of the object. For another example, when the marker 120 includes an instance of a class of objects, the input values can specify parameters that allow the functions to identify which instance the marker 120 includes, information about that instance, or otherwise appropriate information.

At a step 222, the mobile device 110 can invoke the functions when it recognizes the one or more selected markers 120. For example, when the mobile device 110 determines that a view of a selected object input from a camera matches a description of one or more selected markers 120, the selected markers 120 could be specifically identified markers, or could be instances of a class of markers having a generic description, as further described herein.

As part of this step, the mobile device 110 can send the generated input values to the functions being invoked, such as by passing those input values as arguments or parameters to those functions.

In one embodiment, the one or more functions can each include a script, such as written in a scripting language associated with the mobile device 110 or otherwise, a smartphone app disposed to operate on the mobile device 110 (or on a distinct device) or otherwise, another program disposed to operate on the mobile device 110 or on a distinct device, another type of function, or otherwise.

The method can proceed with the next flow point.

Performing Functions

A flow point 230 indicates that the method 200 is ready to perform functions associated with one or more detected markers 120.

At a step 231, the mobile device 110 can perform the invoked functions using a processor and program and data memory available at the mobile device 110. In one embodiment, the mobile device 110 can maintain storage for information stored or used by those functions, can access one or more databases, whether local or remote, maintained or used by those functions, can access one or more internal or external devices used by those functions, and can otherwise perform actions required or requested by those functions.

At a step 232, the mobile device 110 can receive user inputs (or inputs other than from the user 101) when performing one or more functions. For example, the user 101, when viewing an animated augmented or virtual reality presentation, can alter the orientation, or otherwise move, of the mobile device 110. This can have the effect that an accelerometer (such as a triaxial accelerometer) can provide inputs to the function providing the augmented or virtual reality presentation. The function can alter the augmented or virtual reality presentation to account for the altered orientation or movement of the mobile device 110.

For another example, the user 101 can provide inputs such as touching or pressing on the face of the mobile device 110. This can have the effect that a capacitive sensor, a pressure sensor, or another input device, can provide input values from the mobile device 110 to the one or more functions. For example, when the animated augmented or virtual reality presentation is part of a game or other interactive activity, the function can receive those input values from the mobile device 110 and adjust or alter the presentation in response thereto.

In one embodiment, user input can include, as further described herein, one or more of:

adjusting or altering an orientation or location of the mobile device 110, such as tilting the mobile device, moving the mobile device closer or farther away, walking or traveling while carrying the mobile device, shaking the mobile device, or otherwise;

touching or pressing on the face of the mobile device 110, touching or pressing one or more buttons or keys on the mobile device, touching or pressing one or more other controls associated with the mobile device, or otherwise;

providing voice or other audio input to the mobile device 110, such as providing voice commands, or otherwise talking or singing, or otherwise providing audio input, such as music or voice input from another source, or otherwise;

providing radio or other electromagnetic input to the mobile device 110, such as disposing the mobile device near a wifi hotspot, sending an SMS or MMS message (or other text message, or a variant thereof) to the mobile device, sending an email message or HTTP message (hypertext protocol, or a variant thereof) to the mobile device, disposing the mobile device so as to receive signals from an NFC (near field communication) or RFID (radio frequency ID) device, or otherwise;

or otherwise providing data input or another state change to the mobile device 110.

At a step 233, the functions can apply user inputs, or other inputs received by the mobile device 110 or an associated device, and generate one or more state changes in response thereto. For example, when providing an augmented or virtual reality presentation, the functions can alter an angle associated with a POV (point of view) for the augmented or virtual reality presentation. For another example, when the functions provide a game, the state changes can be responsive to changes in one or more states of the game. In such cases, state changes of a game can be responsive to both the user of the mobile device 110, users of remote devices, and a server disposed to manage the game. This can have the effect that the game can be conducted among multiple players, such as coupled using a communicate system. In such cases, the communicate system can include a computer network, a telephone switching network, another messaging network, or otherwise.

At a step 234, the functions can generate or send one or more outputs. For example, the outputs can include one or more of:

one or more visual presentations, such as an animated augmented or virtual reality presentation, one or more still pictures or text images for viewing by the user 101, or otherwise;

one or more audio outputs, such as a generated voice output, a song or other musical output, an alarm or associated audio output, or otherwise;

one or more haptic outputs, such as a buzzer, vibration, or otherwise;

one or more electromagnetic outputs, such as initiating or continuing a telephone call, sending an SMS or MMS message, or other text message or variant thereof, sending an email message or HTTP message or variant thereof, communicating with an external device, such as a wifi router, an NFC device, or otherwise;

sending one or more messages to external devices, whether local devices or remote devices, or otherwise;

or otherwise providing data output from the mobile device 110.

As part of this step, the functions can communicate using a computing system to interact with another device, whether a local device or a remote device. This can have the effect that the user 101 can interact with other users while using the functions. For example, the functions can send and receive images to both the mobile device's local user 101 and to remote users, such as in response to actions by the local user and the remote users. This can have the effect that the local user 101 and the remote users can interact, such as using a communication technique, a game, a type of social media, or otherwise.

At a step 235, as further described herein, the mobile device 110 can repeat the steps associated with performing. This can have the effect that the functions can loop or otherwise continue operation until reaching a termination condition. For example, the termination condition can be identified by the function, such as when the function determines that it has completed its operation. For another example, the termination condition can be identified in response to the mobile device 110 detecting one or more other markers 120 whose functions have higher priority than the current function. In such cases, the current function can be terminated, or can be suspended until higher priority functions are completed (when they have not become irrelevant or stale).

The method can proceed with the next flow point.

End of Method

A flow point 200B indicates that the method 200 is ready to finish. The method 200 finishes operations and cleans up after any ongoing operations.

For example, the mobile device 110 can de-allocate and possibly erase any buffer storage or terminated storage values, and can perform any terminating routines with respect to the marker 120.

In one embodiment, the method 200 can be restarted as triggered by any technique described with respect to the flow point 200A.

Alternative Embodiments

Although this Application primarily describes one set of preferred techniques for using sensors to detect markers and to invoking and performing functions in response thereto, in the context of the invention, there is no particular requirement for any such limitation. Other techniques for using sensors, detecting markers, and invoking and performing functions, and related matters, would also be workable, and are within the scope and spirit of this description. After reading this Application, those skilled in the art would be able to incorporate such other techniques with the techniques shown herein.

The invention claimed is:

1. Apparatus including one or more markers;
one or more sensors disposed to recognize at least one of the markers;
one or more processors disposed to, in response to at least one of the sensors, generate one or more AR (augmented reality) or VR (virtual reality) experiences;
a presentation device disposed to, in response to at least one of the processors, provide an animated AR or VR presentation, the presentation being in response to a relative location or orientation of the presentation device with respect to a user;
wherein
at least one marker is associated with an item of jewelry;
at least one sensor and at least one presentation device is associated with a smartphone or other mobile device;
wherein the item of jewelry can include an animated AR or VR experience that the user can share.

2. Apparatus as in claim 1, including
a function associated with at least one of the markers;
wherein
at least one processor can perform the function in response to one or more user actions;
in response to performing the function, at least one processor can perform one or more of: providing the animated AR or VR presentation, or altering the animated AR or VR presentation in response to one or more of: (A) one or more changes in the markers, (B) user interaction with at least one of the markers, or (C) one or more changes in a relative location or orientation of one or more sensors with respect to the markers.

3. Apparatus as in claim 1, wherein
said sensors are disposed to determine one or more markers in response to a description of said markers accessible by the mobile device;
at least a portion of the description of said markers is included in a database;
at least one of the sensors is responsive to a comparison of the data and one or more entries in the database.

4. Apparatus as in claim 1, wherein
at least one of the markers includes a description of a class of items;
at least one of the sensors is disposed to identify the presence of the marker as including at least one instance of the class.

5. Apparatus as in claim 1, wherein
at least one of the markers includes a particular picture.

6. Apparatus as in claim 1, wherein
at least one of the sensors is responsive to context information accessible to a mobile device.

7. Apparatus as in claim 6, wherein
at least a portion of the context information is maintained in a database.

8. Apparatus as in claim 6, wherein
at least a portion of the context information includes a date or time.

9. Apparatus as in claim 1, wherein
at least one of the sensors is responsive to state information with respect to a mobile device.

10. Apparatus as in claim 1, wherein
at least one of the processors or the presentation device is disposed to provide an interactive process with a user and the animated augmented or virtual reality presentation.

11. Apparatus as in claim 10, wherein
the interactive process includes one or more of:
determining a relative location or orientation of the mobile device with respect to a user;
exchanging data with a remote device;
receiving data input from the user;
determining an interaction between the user and at least a portion of the augmented or virtual reality presentation.

* * * * *